United States Patent
Odio et al.

(10) Patent No.: US 8,732,255 B2
(45) Date of Patent: May 20, 2014

(54) DYNAMICALLY CREATED SHARED SPACES

(75) Inventors: Samuel Odio, Portola Valley, CA (US); Robert Sean Goodlatte, San Francisco, CA (US); Justin Shaffer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 72 days.

(21) Appl. No.: 13/229,241

(22) Filed: Sep. 9, 2011

(65) Prior Publication Data

US 2013/0066963 A1 Mar. 14, 2013

(51) Int. Cl.
*G06F 15/16* (2006.01)

(52) U.S. Cl.
USPC .......................................................... 709/206

(58) Field of Classification Search
USPC .................. 709/223, 224, 203, 206, 217, 219
See application file for complete search history.

(56) References Cited

U.S. PATENT DOCUMENTS

| | | | |
|---|---|---|---|
| 7,669,123 B2 * | 2/2010 | Zuckerberg et al. | 715/273 |
| 7,698,660 B2 * | 4/2010 | Sanchez et al. | 715/863 |
| 8,108,414 B2 * | 1/2012 | Stackpole | 707/758 |
| 8,108,501 B2 * | 1/2012 | Birnie et al. | 709/223 |
| 8,335,763 B2 * | 12/2012 | Narayanan et al. | 707/628 |
| 8,438,156 B2 * | 5/2013 | Redstone et al. | 707/724 |
| 2006/0184617 A1 * | 8/2006 | Nicholas et al. | 709/203 |
| 2006/0230061 A1 * | 10/2006 | Sample et al. | 707/103 R |
| 2006/0265418 A1 | 11/2006 | Dolezal | |
| 2007/0198534 A1 * | 8/2007 | Hon et al. | 707/10 |
| 2007/0255785 A1 | 11/2007 | Hayashi | |
| 2008/0040673 A1 * | 2/2008 | Zuckerberg et al. | 715/745 |
| 2008/0102856 A1 * | 5/2008 | Fortescue et al. | 455/456.1 |
| 2008/0114844 A1 * | 5/2008 | Sanchez et al. | 709/206 |
| 2008/0126366 A1 | 5/2008 | Malik | |
| 2008/0195657 A1 | 8/2008 | Naaman | |
| 2008/0195741 A1 * | 8/2008 | Wynn et al. | 709/229 |
| 2009/0047972 A1 * | 2/2009 | Neeraj | 455/456.1 |
| 2009/0157680 A1 | 6/2009 | Crossley | |
| 2010/0029326 A1 | 2/2010 | Bergstrom | |
| 2010/0057768 A1 | 3/2010 | Chen | |
| 2010/0058196 A1 | 3/2010 | Krishnan | |
| 2010/0083124 A1 * | 4/2010 | Druzgalski et al. | 715/738 |
| 2010/0114965 A1 * | 5/2010 | Dean et al. | 707/784 |
| 2010/0130226 A1 * | 5/2010 | Arrasvuori et al. | 455/456.1 |
| 2010/0153857 A1 * | 6/2010 | Sanchez et al. | 715/756 |
| 2011/0173316 A1 * | 7/2011 | Moromisato et al. | 709/224 |
| 2011/0179118 A1 * | 7/2011 | Dean et al. | 709/204 |
| 2011/0260860 A1 * | 10/2011 | Gupta | 340/539.13 |
| 2011/0270931 A1 * | 11/2011 | Cheng et al. | 709/206 |
| 2011/0276398 A1 * | 11/2011 | Peng | 705/14.53 |
| 2011/0282893 A1 * | 11/2011 | Dolin et al. | 707/769 |
| 2012/0109757 A1 * | 5/2012 | Kendall et al. | 705/14.71 |
| 2012/0185486 A1 * | 7/2012 | Voigt et al. | 707/741 |
| 2012/0290637 A1 * | 11/2012 | Perantatos et al. | 709/203 |

(Continued)

OTHER PUBLICATIONS

International Search Report and Written Opinion for International Application PCT/US2012/035475, Nov. 28, 2012.

(Continued)

*Primary Examiner* — Leshonda Jacobs
(74) *Attorney, Agent, or Firm* — Baker Botts L.L.P.

(57) ABSTRACT

In one embodiment, a social networking system automatically create a shared space for posting requests to the social networking system from multiple users based on social, spatial and temporal proximity, and create a news feed corresponding to the shared space.

12 Claims, 9 Drawing Sheets

(56) References Cited

U.S. PATENT DOCUMENTS

| | | | |
|---|---|---|---|
| 2012/0304057 A1* | 11/2012 | Labsky et al. | 715/256 |
| 2013/0013700 A1* | 1/2013 | Sittig et al. | 709/206 |
| 2013/0014031 A1* | 1/2013 | Whitnah et al. | 715/753 |
| 2013/0018823 A1* | 1/2013 | Masood | 706/12 |
| 2013/0024511 A1* | 1/2013 | Dunn et al. | 709/204 |
| 2013/0031034 A1* | 1/2013 | Gubin et al. | 706/12 |
| 2013/0066964 A1* | 3/2013 | Odio et al. | 709/204 |
| 2013/0103757 A1* | 4/2013 | Mitchell et al. | 709/204 |
| 2013/0174275 A1* | 7/2013 | Micucci et al. | 726/28 |
| 2013/0304822 A1* | 11/2013 | Tetreault | 709/204 |

OTHER PUBLICATIONS

Office Action for U.S. Appl. No. 13/097,915, Dec. 18, 2012.
U.S. Appl. No. 13/097,915, filed Apr. 29, 2011, Garcia.

* cited by examiner

DYNAMICALLY CREATED SHARED SPACES

TECHNICAL FIELD

The present disclosure generally relates to a social networking system, and more particularly, to methods of automatically creating a shared space for posting requests to the social networking system from multiple users based on social, spatial and temporal proximity, and creating a news feed corresponding to the shared space.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to methods of automatically creating a shared space for posting requests to the social networking system from multiple users based on social, spatial and temporal proximity, and creating a news feed corresponding to the shared space. These and other features, aspects, and advantages of the disclosure are described in more detail below in the detailed description and in conjunction with the following figures.

DETAILED DESCRIPTION

Figure 1:
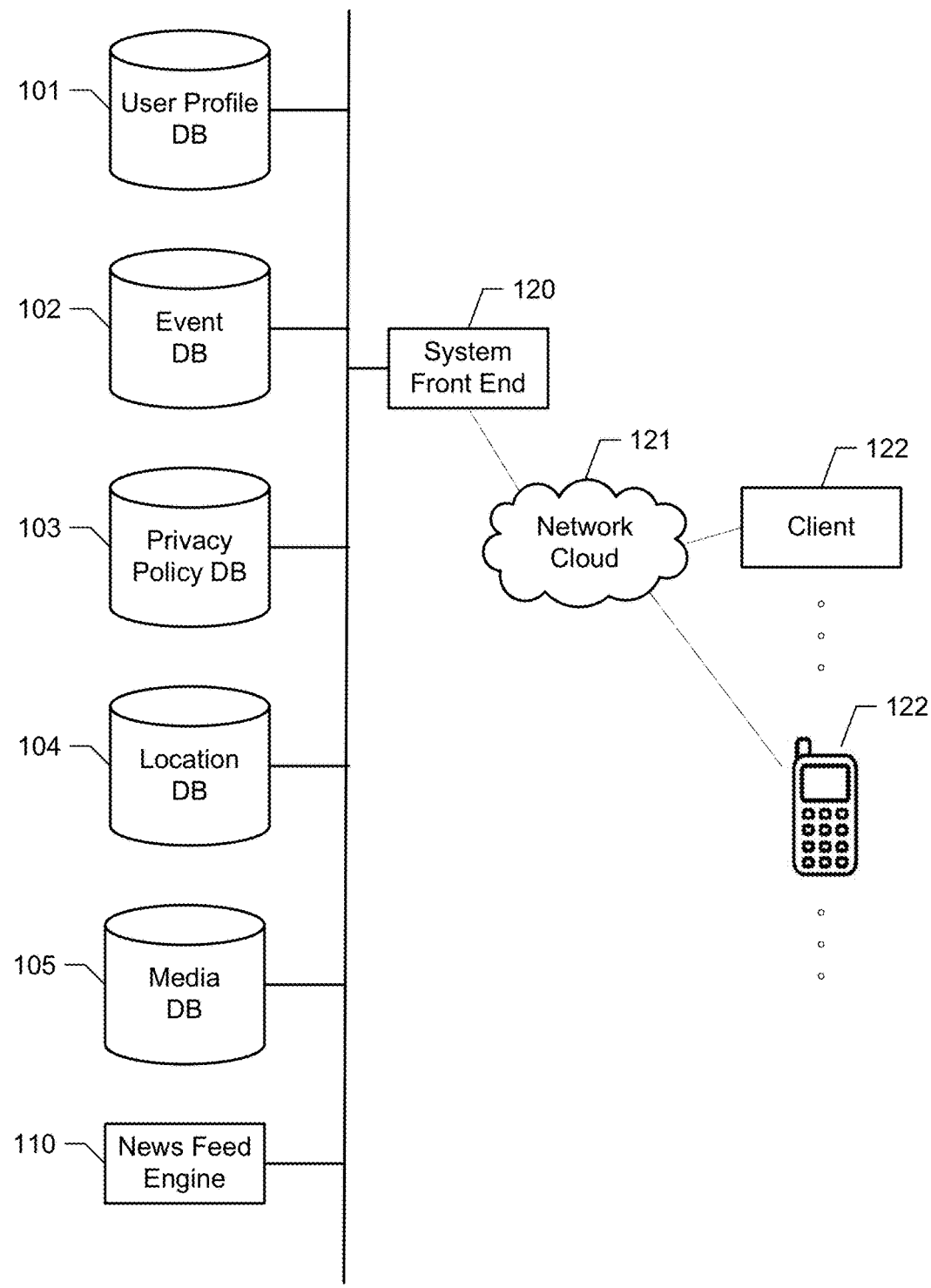
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events associated with users within a threshold degree of separation of a subject user, and/or updates to pages that a user has liked or otherwise established a subscriber relationship. Individual users of the social networking system may subscribe to specific news feeds of interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in location database 104. As described in U.S. patent application Ser. No. 12/763,171, information about a created place may be stored in a hub node in a social graph, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, a user of the social networking system may upload one or more media files to media database 105. For example, a user can upload a photo or a set of photos (often called a photo album), or a video clip (or an audio clip) to media database 105 from a client device 122 (e.g., a computer, or a camera phone). The user may further select one or more privacy settings for each of the uploaded media files (e.g., accessible to only first-degree connections, accessible to only first- and second-degree connections, accessible to all users of the social networking system). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. In one implementation, the client device 122 may implement the Exchangeable image file format (Exif), or a modified version thereof. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. U.S. Pat. No. 7,945,653, herein incorporated by reference in its entirety and for all purposes, describes methods of enabling a first user of a social networking system to select a region of a photo and associate the selected region to a second user, and in response to a confirmation from the second user, storing the association in a database. As described in U.S. patent application Ser. No. 12/763,171, the photo and related information (e.g., one or more privacy settings) may be stored in a particular node of a social graph, while the association between the photo and the second user may be stored in an edge connecting the particular node and a user node for the second user. For example, in response to a user's request, the social networking system may, based on the one or more privacy settings, display the photo with a tag corresponding to the second user, while the tag comprises a link to a webpage (e.g., a user profile page) associated with the second user. In particular embodiments, the social networking system may also extract metadata from a media file and store the metadata in media database 105.

In particular embodiments, news feed engine 110 may access user profile database 101, event database 102, location database 104 and media database 105 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, location database 104 and media database 105 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event. Particular embodiments herein describe methods of automatically creating a shared space for posting requests to the social networking system (e.g., requests for status update, photo upload, or location check-in) from multiple users based on social, spatial and temporal proximity, and creating a news feed corresponding to the shared space.

Figure 2:
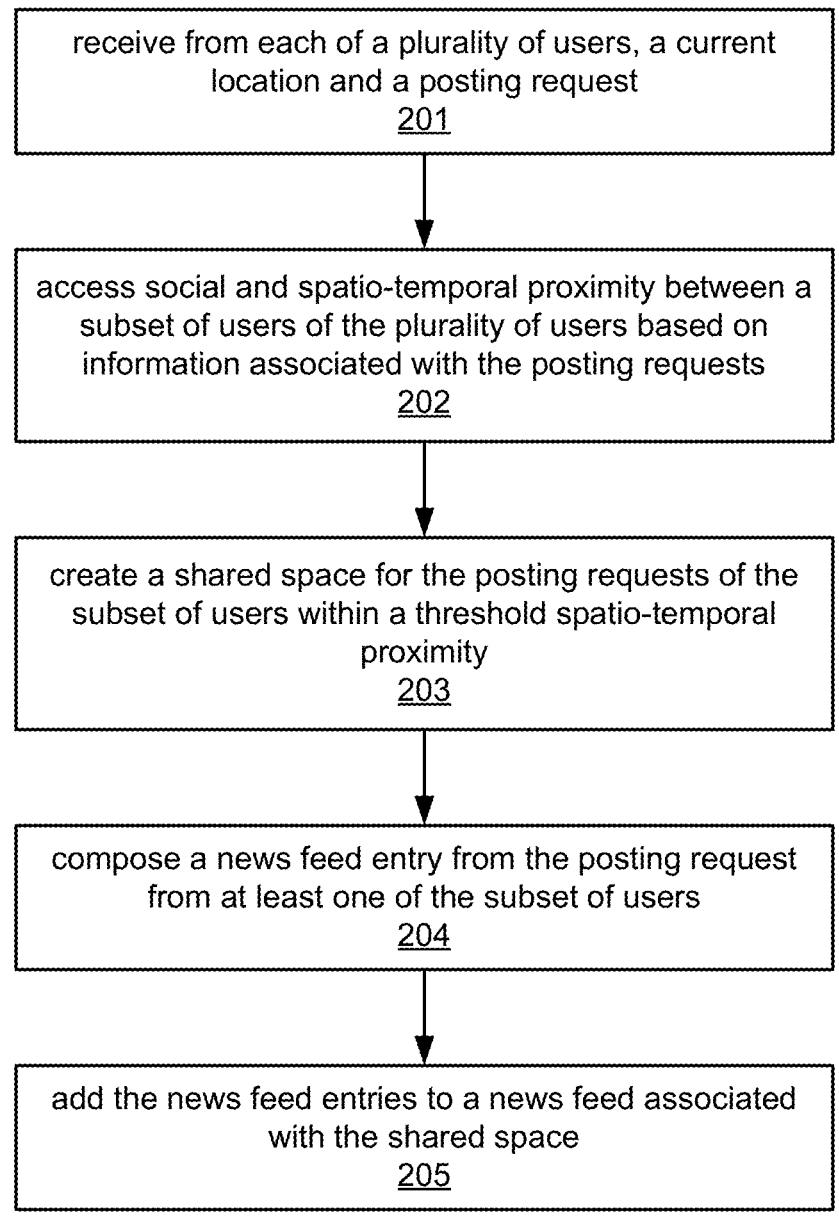
FIG. 2 illustrates an example method of dynamically creating a shared space for posting requests from multiple users.

FIG. 2 illustrates an example method of dynamically creating a shared space for posting requests submitted by multiple users. FIG. 2 can be implemented by a shared space creating process hosted by one or more computing devices of the social networking system. The server-side shared space creating process may operate in connection with a client-side posting application hosted on one or more client devices. In particular embodiments, the shared space creating process may receive from each of a plurality of users a current location and a posting request to the social networking system (201). In particular embodiments, a posting request may comprise a request for uploading one or more media files (e.g. a still photographic picture, a video clip, or a still frame of a video clip), a location or place check-in request, a status update (e.g., a text string, an URL link), or a response to an event invitation (e.g., "accept", "tentative", "decline"). For example, the shared space creating process may receive from multiple people attending a baseball game, individual posting requests from each individual's mobile device to the social networking system. A user may access a client posting application (e.g., a photo uploading tool, or a special-purpose client application for the social networking system such as Facebook for iPhone) hosted by the user's GPS-equipped mobile phone and compose a posting request, causing the client posting application to transmit a posting request comprising the user's identifier for the social networking system and the user's current location (e.g., GPS coordinates) with a time stamp. Additionally, if a user's location data is not available from the posting request (e.g., no GPS signal received by the user's mobile phone at the time of the posting request), the shared space creating process may access location database 104 to retrieve the user's most recent location and associated time stamp (e.g., the most recent recorded GPS coordinates and associated time stamp from the use's GPS-equipped mobile phone, or the most recent location check-in data). Other methods for identifying the location of the user may include data reports from POS terminals or mobile devices of other users that have interacted with the user's mobile phone via BlueTooth or Near-Field Communications protocols. Yet another method for identifying the location of the user may include location and time stamp data from a recent photo that the user is tagged in or otherwise associated with.

In particular embodiments, the shared space creating process may assess social and spatio-temporal proximity between a subset of users of the plurality of users based on information associated with the posting requests (202). If there is a threshold number of posting requests within the subset of users or their posting requests fit a profile that indicates a shared space is likely, the shared space creating process may automatically create a shared space. For example, the shared space creating process can access user profile database 101 based on the user identifiers, location data and time stamp data of the uploading requests, to identify a subset of users who are within one or two degrees of separation from each other, and are requesting to post from locations within a threshold radius, and within a threshold time window (such as 20 to 45 minutes). The shared space creating process may determine a common location by averaging GPS coordinates locations of the posting requests for the subset of users, and determine a common time instance by averaging time stamp data of the posting requests from the subset of users.

In particular embodiments, the share space creating process may create a shared space for the posting requests of the subset of users within a threshold spatio-temporal proximity (203). In one implementation, a shared space can be maintained as a hub node in a social graph or other data structure maintained by the social networking system, as described in U.S. patent application Ser. No. 12/763,171. In particular embodiments, the shared space creating process may create a shared space based on a common location and a common time instance between the identified subset of users. For example, the shared space creating process can access location database 105 and based on the common location, identify a location or a place (e.g., a coffee shop, a ball park, a beach) near the common location, and create a shared space (e.g., "Wrigley Field, 4 Jul. 2010") based on the common location and the common time instance. For example, the shared space creating process can access location database 104 to identify a location or a place based on the common location, access event database 102 based on the identified location or place and the common time instance, and create a shared space by identifying an event happening at or near the identified location and the common time instance (e.g., a baseball game "Mets vs. Cubs").

In particular embodiments, the shared space creating process may associate the shared space to the posting requests of the subset of users and store the posting requests in one or more data stores. For example, a particular user of the subset of users may request to upload media files to the social networking system, using a client posting application (e.g., a photo uploading tool) hosted by the particular user's mobile phone. The shared space creating process can transmit a message to the client posting application, causing the client posting application to add (or tag) the shared space to metadata of the media files that the particular user requests to upload to the social networking system. The shared space creating process can store the tagged media files uploaded to the social networking system by the client posting application in media database 105. For example, a particular user of the subset of users may request to check in to a place corresponding to the shared space (e.g., a baseball park "Wrigley Field" for a shared space "Mets vs. Cubs"). The shared space creating process may store the particular user's check-in activity and its association with the shared space in location database 104. For example, the shared space creating process may store a user's status update (e.g., a text string and a time stamp) and its association with the shared space in user profile database 101. In particular embodiments, the shared space creating process may set one or more privacy settings for the posting requests. For example, the share space creating process can limit access to a posting request of a shared space to first-degree contacts of the requesting user. In some implementations, the user may be prompted to specify privacy settings while making a posting request.

In one embodiment, the shared space creating process may suggest a first shared space to at least one of the subset of users. For example, for each user of the subset of users, the shared space creating process can transmit a message to the client posting application hosted by the user's mobile phone, causing the client posting application to present the first shared space to the user. If one or more users of the subset of users confirm the first shared space, the shared space creating process may associate the first shared space to the posting request from each of the subset of users and store the posting requests in one or more data stores.

In particular embodiments, the shared space creating process may create and store an event associated with the shared space in event database 102. In some embodiments, the shared space creating process may configure the event associated with the shared space to be unique to the subset of users, for example, the attendees of the event associated with the shared space can comprise of only the subset of users. In one embodiment, system front end 120 may, as request by a user, construct and serve a structured document (e.g., a web page, an iframe) of a hub node corresponding to the shared space, as described in U.S. patent application Ser. No. 12/763,171. Yet in another embodiment, the shared space creating process may create a photo album for the shared space and associate one or more media files (e.g., a photo, a video clip) from the posting requests (e.g. from a photo uploading request) with the photo album, i.e., upload the media files to the photo album. The shared space creating process may also set one or more privacy settings on the photo album for the newly created shared space, such as limiting access to the photo album to the first-degree contacts of the users whose photos have been included in the photo album.

In addition to an event, a web page, or a photo album, the shared space creating process may create one or more news feeds corresponding to the newly created shared space. In particular embodiments, the shared space creating process may compose a news feed entry from the posting request from at least one of the subset of users (204). In particular embodiments, the shared space creating process may add the news feed entries to a news feed associated with the shared space (205). In particular embodiments, the shared space creating process may create a structured document (e.g., a web page) comprising the news feed associated with the shared space. For example, assume for didactic purposes that three first-degree friends (e.g., John, Bill, and Nick) attend a baseball game between New York Mets and Chicago Cubs at Wrigley Field on 4 Jul. 2010. During the baseball game, each of them with a mobile device (e.g., a mobile phone, a tablet computer) and uses the client posting application described above to transmit posting requests from the mobile device to the social networking system—e.g., posting a status update, uploading photos taken by the mobile device, checking in to a location "Wrigley Field". There may be hundreds of other people at Wrigley Field also transmitting posting requests to the social networking system during the baseball game. With the example method illustrated by FIG. 2, the shared space creating process can create a particular shared space "Mets vs. Cubs" unique to the three first-degree friends, and automatically associate the particular shared space to the posting requests from the three first-degree friends. For example, the shared space creating process can compose news feed entries from posting requests from the three first-degree friends, and add the news feed entries to a news feed associated with the particular shared space.

Figure 3:
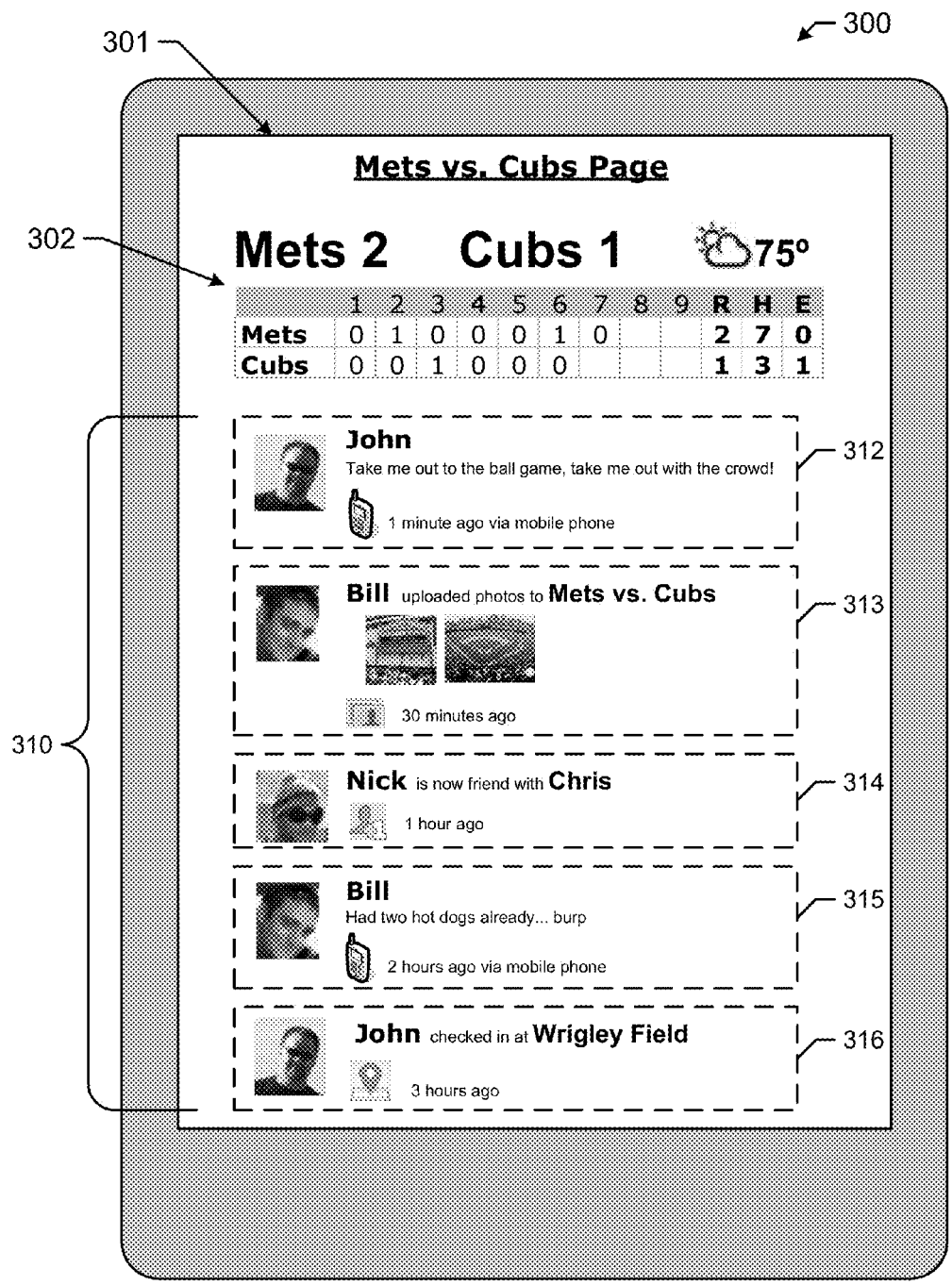
FIGS. 3 and 3A-E illustrate example web pages and aggregated news feed entry for a shared space.

FIG. 3 illustrates an example web page of a shared space. For example, a user (e.g., Nick) of the three first-degree friends described above may request a web page associated with the particular shared space "Mets vs. Cubs" from the user's computing device 300. In response to the user's request, the social networking process may access one or more remote data stores for a current score table and a current weather condition, construct a web page (301) comprising the current score table, the current weather condition (302), and the news feed associated with the particular shared space "Mets vs. Cubs" (310), and transmit the web page to the user's computing device 300 to be displayed in a display of computing device 300 (e.g., a tablet computer), as illustrated in FIG. 3. Since the particular shared space is unique to the three first-degree friends (John, Bill, Nick), news feed 310 in the example web page 301 of FIG. 3 comprises news feed entries 312, 313, 314, 315, and 316 from the posting requests from the three first-degree friends John, Bill, and Nick.

In other embodiments, the shared space creating process may create a shared space for posting requests of more than one subset of users as described in the example method of FIG. 2. For example, the shared space creating process may create the particular shared space "Mets vs. Cubs" described above for all posting requests to the social networking system from users at or near the particular baseball park during the particular baseball game.

Access to each news feed entry associated with a shared space may be based on privacy setting of the each news feed entry. For example, the social networking system may set privacy settings for each news feed entry associated with a shared space as accessible to the corresponding requesting user of the each news feed entry and the requesting user's first-degree contacts. For example, the social networking system may set privacy settings for each news feed entry associated with a shared space as accessible to the corresponding requesting user of the each news feed entry and to users who are within two degrees of separations from the requesting user. For example, the social networking system may set privacy settings for all news feed entry associated with a shared space as accessible to all users of the social networking system. In some embodiments, a requesting user may specify privacy setting for a posting request (thus a corresponding news feed entry) while making the posting request.

Figure 3A:
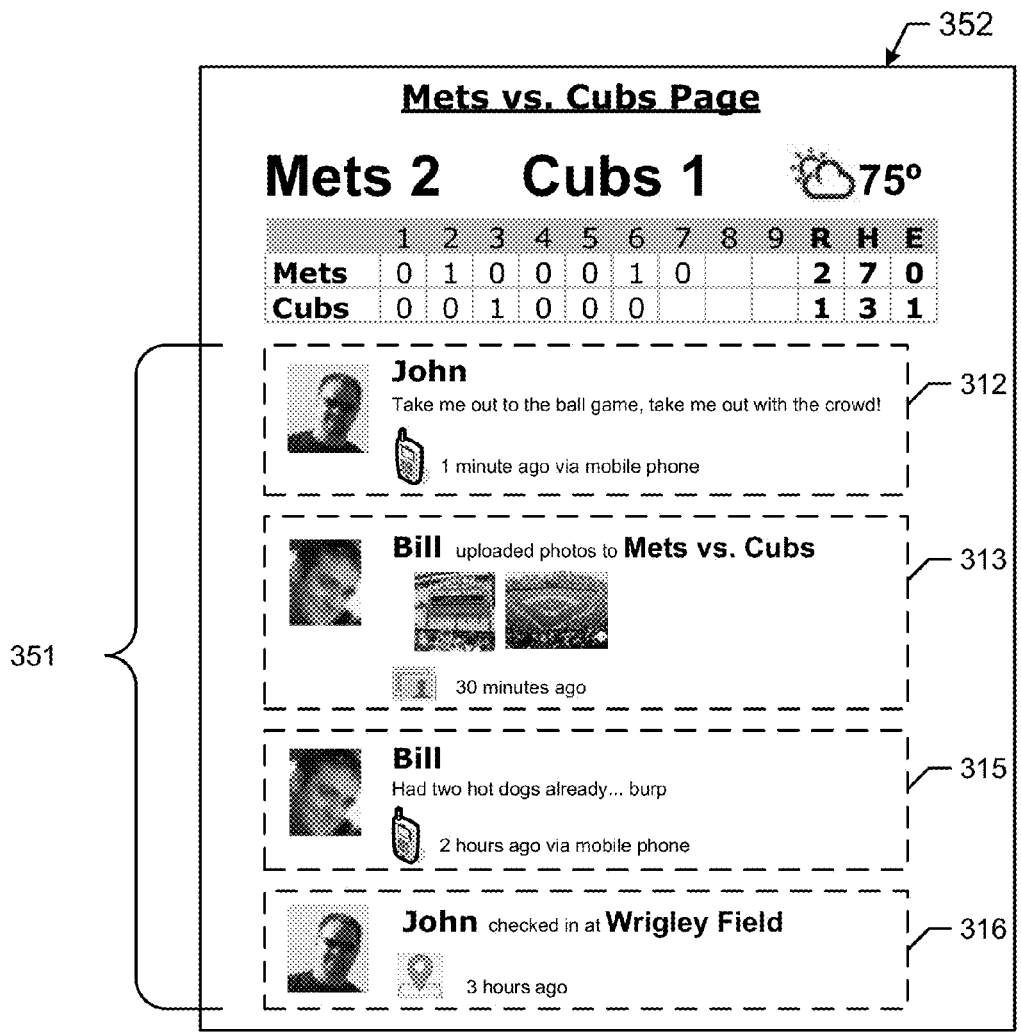
Figure 3B:
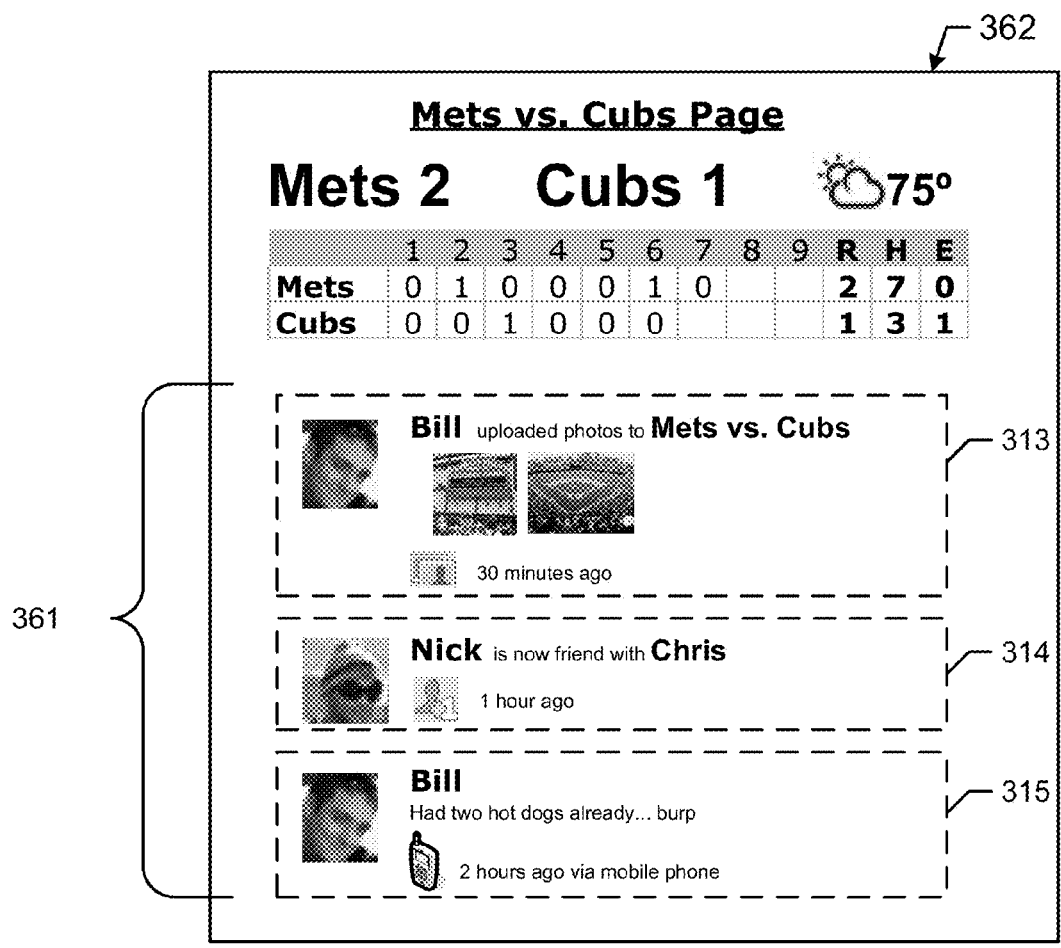

As access to each news feed entry of a news feed associated with a shared space may be specific to a particular user based on privacy settings, a web page comprising the news feed for the shared space may be specific to a particular viewing user based on privacy settings, as illustrated in FIGS. 3A and 3B. In the examples of FIGS. 3A and 3B, the social networking system may set privacy settings for a news feed entry associated with the shared space "Mets vs. Cubs" (as illustrated in FIG. 3) as accessible to the corresponding requesting user of the news feed entry and the requesting user's first-degree contacts. For example, a first viewing user Adam is a first-degree contact to John and Bill in the baseball game example illustrated in FIG. 3. A second viewing user Allen is a first-degree contact to Nick and Bill in the baseball game example illustrated in FIG. 3. As illustrated in FIG. 3A, web page 352 comprising news feed 351 associated with the shared space "Mets vs. Cubs" for the first viewing user Adam only contains contents associated with his first-degree contacts John and Bill (e.g., news feed entries 312, 313, 315, and 316). As illustrated in FIG. 3B, web page 362 comprising news feed 361 associated with the shared space "Mets vs. Cubs" for the second viewing user Allen only contains contents associated with his first-degree contacts Nick and Bill (e.g., news feed entries 313, 314, and 315).

Figure 3C:
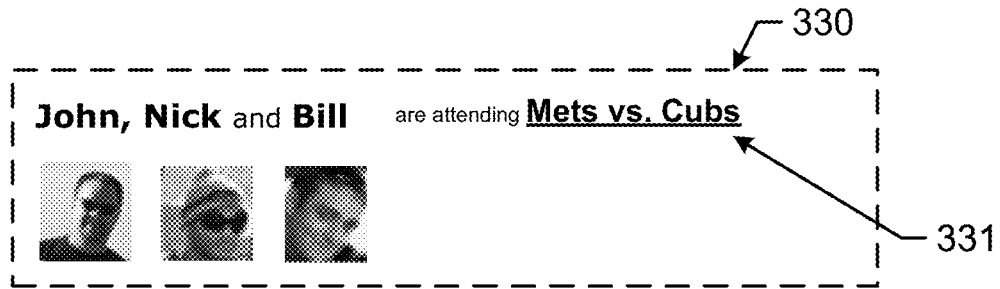

As discussed above, posting requests may be converted into individual news feed entries displayed on a news feed of a page associated with the shared space. In addition, the posting requests associated with a given shared space may also be aggregated into a single news feed entry for display in another news feed associated, for example, a home page of a user. FIG. 3C illustrates an exemplary aggregated news feed entry 330 for web page 301 illustrated in FIG. 3. For example, aggregated news feed entry 330 may comprise a selectable link to web page 301 (331) and profile pictures of users associated web page 301. The content of an aggregated news feed entry may further comprise thumbnails of uploaded photos, check-in activities, and/or status updates associated with web page 301.

Figure 3D:
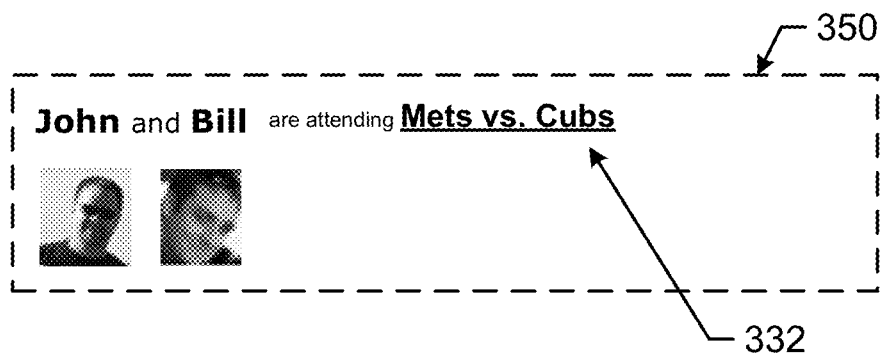
Figure 3E:
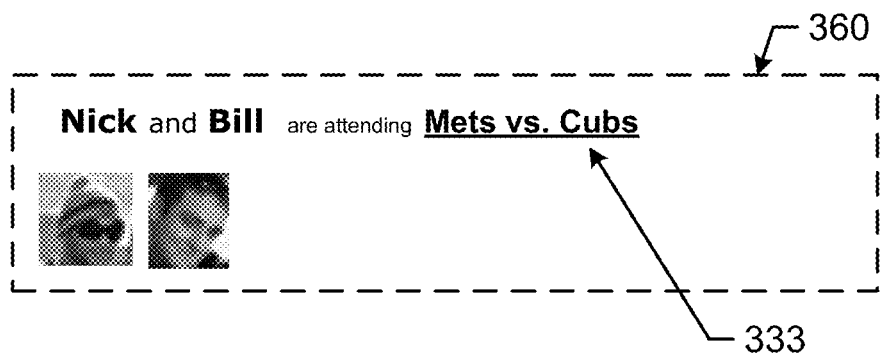

Without this aggregation, a given user accessing a home page may see a news feed with multiple news feed items from different contacts that actually correspond to the same basic event, such as multiple pictures from different friends of the same event. Aggregating these posting requests based on a shared space consolidates this information into a single news feed entry that a user may click to link to a page associated with the shared space. The contents of the aggregated news feed entry displayed to the user, such as thumbnails of user profile pictures and uploaded photos, check-in activities, status updates, may be different depending on the view user. An aggregated news feed entry for a first user may display photos and other content posted by a first set of contacts, while a second aggregated news feed entry displayed to a second user for the same shared space may show a selected sample of content from a different set of users. Selection of content can be based on affinities, degrees of separation, privacy settings, etc. For example, an aggregated news feed entry for a first user may include content from the first user's first-degree contacts. A system for measuring user affinity is described more generally in U.S. patent application Ser. No. 11/503,093, filed on Aug. 11, 2006, which is hereby incorporated by reference in its entirety and for all purposes. For example, an aggregated news feed entry for a first user may include content from one or more users with measured affinity scores (to the first user) above a pre-determined threshold value. An aggregated news feed entry for a first user may only include one or more content objects accessible to the first user based on one or more privacy settings for each of the one or more content objects. FIGS. 3D and 3E illustrate example aggregated news feed entries for different viewing users for a same shared space. For example, aggregated news feed entry 350 illustrated in FIG. 3D corresponds to web page 351 illustrated in FIG. 3A. Aggregated news feed entry 360 illustrated in FIG. 3D corresponds to web page 362 illustrated in FIG. 3B. Both aggregated news feed entry correspond to a same shared space ("Mets vs. Cubs"), but have different content (e.g., profile pictures) for different viewing users. For example, aggregated news feed entry 350 for the first viewing Adam described above contains profile pictures of his first-degree contacts John and Bill and a selectable link 332 to web page 351. For example, aggregated news feed entry 360 for the second viewing user Allen contains profile pictures of his first-degree contacts Nick and Bill and a selectable link 333 to web page 362. As discussed earlier, web page 351 and web page 352 correspond to the same shared space ("Mets vs. Cubs") while containing different content for different viewing users Adam and Allen.

In particular embodiments, the shared space creating process may make the news feed associated with the shared space available to a user when the user is at or near a location associated with the shared space. For example, the shared space creating process may access location database 104 for location data of a particular user. If the particular user is at or near a location associated with the shared space, the shared space creating process may transmit the news feed to a client device (e.g., a mobile device) of the particular user, causing an application hosted by the client device to present the news feed to the particular user. Using the baseball game example described above as an illustration, Joe, a first-degree friend of John (one of the three first-degree friends), enters a bar near Wrigley Field and access the social networking system from a special-purpose client application hosted by Joe's GPS-equipped mobile phone. Based on location data transmitted to the social networking system from Joe's GPS-equipped mobile phone, the shared space creating process may determine Joe is near the location associated with the shared space (i.e., Wrigley Field), and transmit the news feed associated with the shared space to Joe's mobile phone, causing the special-purpose client application to display the news feed in a user interface of the special-purpose client application.

Figure 4:
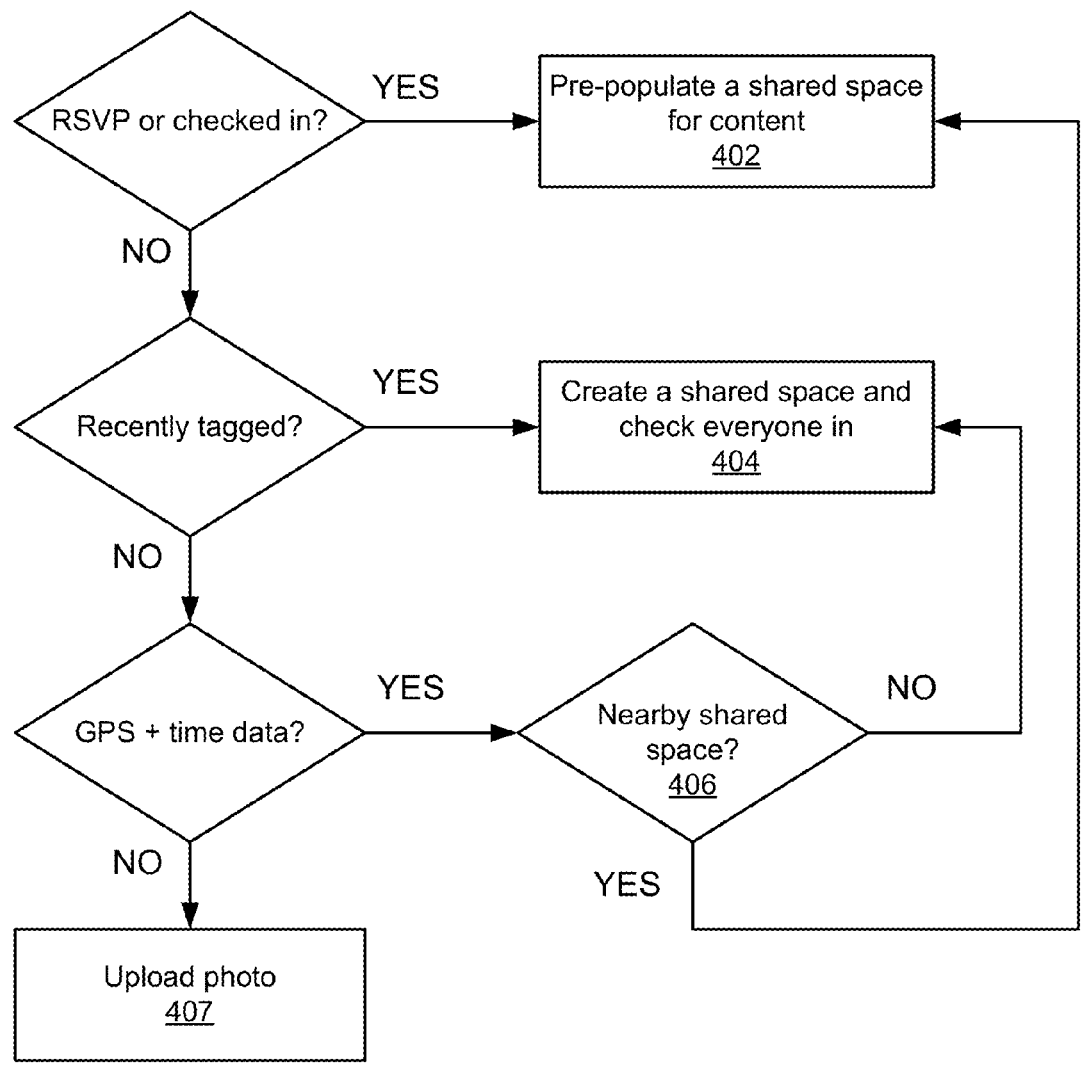
FIG. 4 illustrates an example flow chart or decision tree of creating a shared space for a mobile photo upload request.

FIG. 4 illustrates another example of automatically creating a shared space. FIG. 4 illustrates an example flow chart or decision tree of creating a shared space for a mobile photo upload request. In particular embodiments, the shared space creating process may receive a mobile photo upload request from a first user. For example, the first user may access a photo uploading tool hosted by the first user's GPS-equipped mobile device (e.g. a mobile phone) and select one or more photos stored in the mobile device, causing the photo uploading tool to transmit to the social networking system a message comprising an indication of the available one or more selected photos and the first user's user identifier for the social networking system. The message may further comprise one or more second users (e.g., their corresponding user identifiers) who are tagged in the one or more selected photos, and/or GPS coordinates and a time stamp associated with the one or more selected photos (e.g., based on metadata of the one or more selected photos). In particular embodiments, the shared space creating process may access event database 102 and/or location database 104 (based on the first user's user identifier from the mobile photo upload request) to determine whether the first user is attending a current event (e.g., a birthday party) and/or checking in to a particular location (e.g., a book store). If the first user is attending a current event and/or checking in to a particular location, the shared space creating process may create a shared space corresponding to the current event or the particular location. In particular embodiments, the shared space creating process may pre-populate the shared space with the one or more selected photos from the mobile photo upload request (402). For example, the shared space creating process may store the one or more selected photos (uploaded to the social networking system by the photo uploading tool) in media database 105, and associate the shared space with each of the uploaded photos. In particular embodiments, the shared space creating process may determine whether one or more second users are tagged in the one or more selected photos (e.g., based on the uploading request message from the photo uploading tool). If one or more second users are tagged in the one or more selected photos, the shared space creating process may create a shared space and associate the one or more tagged users to the shared space (404). The shared space creating process may store the one or more selected photos (uploaded to the social networking system by the photo uploading tool) in media database 105, and associate the shared space with each of the uploaded photos. If GPS coordinates and a time stamp is available from the mobile photo upload request, in particular embodiments, the shared space creating process may access location database 105 for a shared space in close proximity to the GPS coordinates and the time stamp (406). If a nearby shared space is found, the shared space creating process may pre-populate the nearby shared space with the one or more selected photos from the mobile photo upload request (402). In particular embodiments, if no shared space can be automatically created, the shared space creating process may store the uploaded photos in media database 105 (407).

Figure 5:
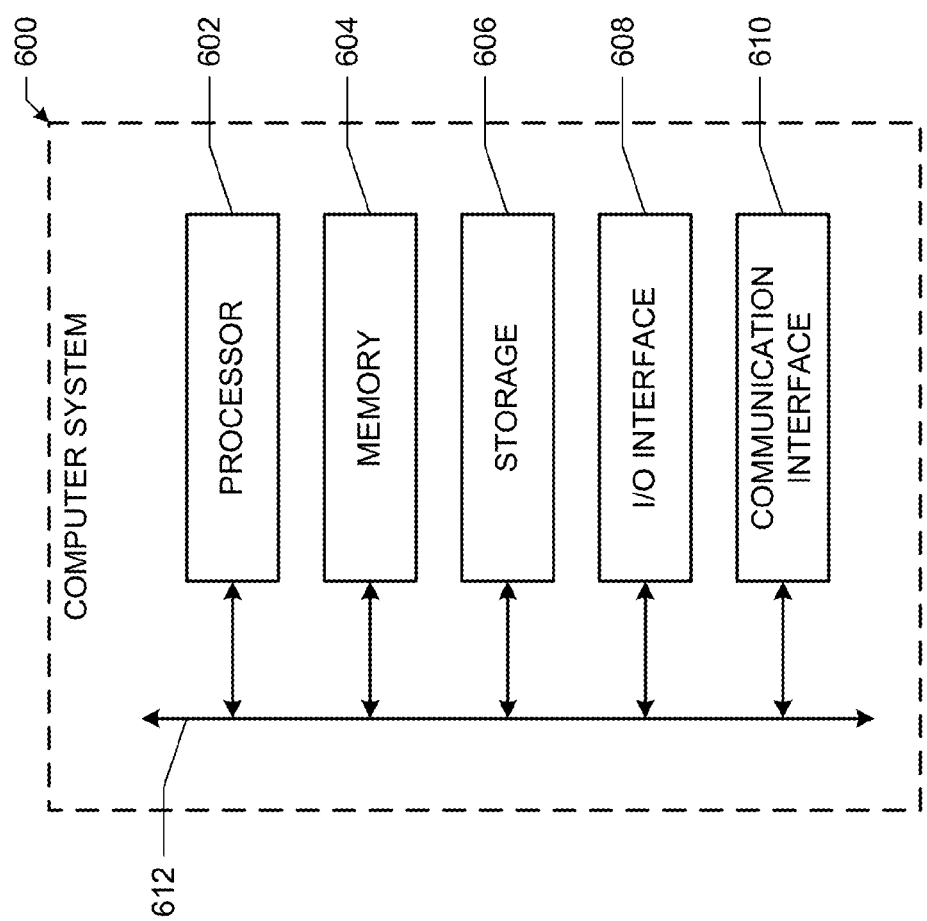
FIG. 5 illustrates an example computer system.

FIG. 5 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate.

Figure 6:
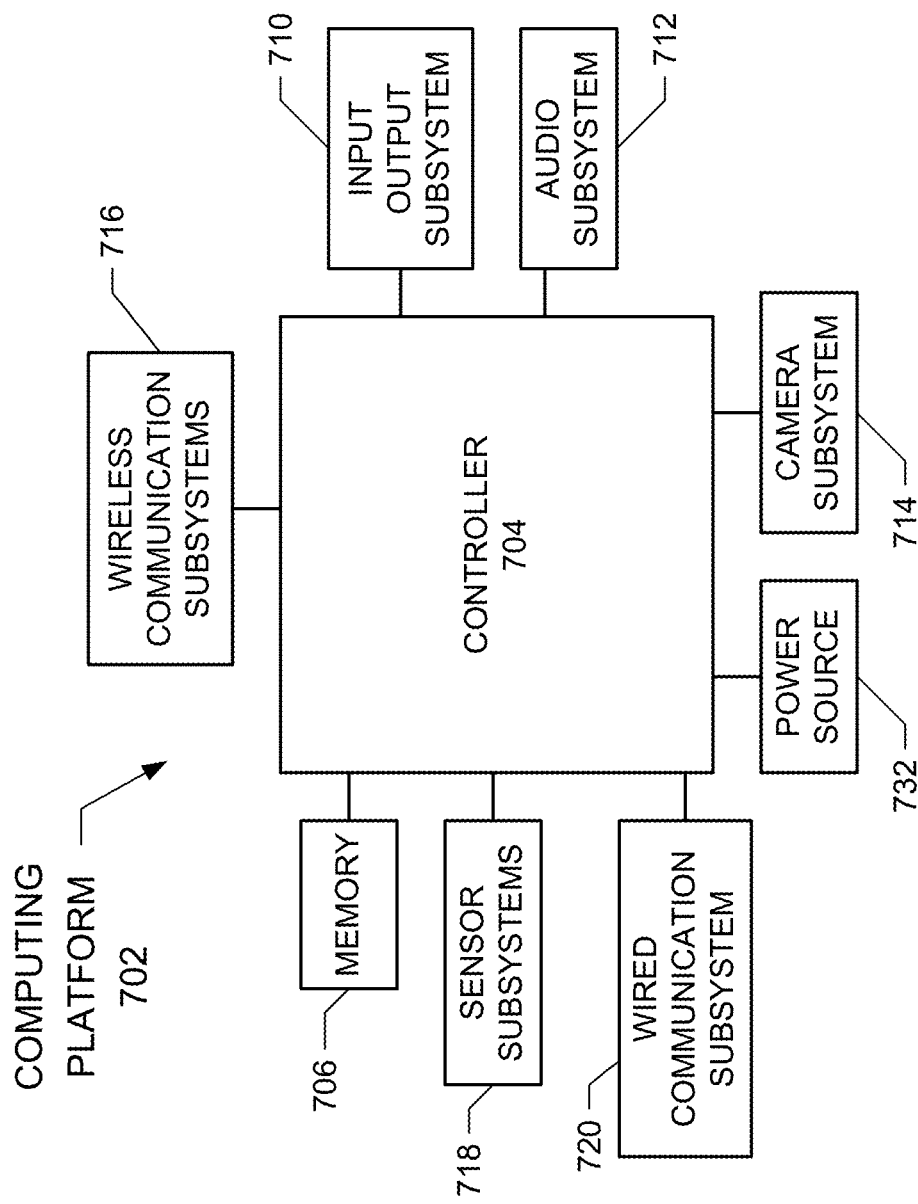
FIG. 6 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 6 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
    by one or more computing devices, receiving, from each of a plurality of users, a current location and a posting request to a social networking system;
    by one or more computing devices, assessing social and spatio-temporal proximity between or among a subset of the users based at least in part on the current location of each of their posting requests;
    by one or more computing devices, based on the assessment, creating a shared space for the posting requests of the subset of the users that are within a threshold spatio-temporal proximity;
    by one or more computing devices, composing one or more news-feed entries from one or more of the posting requests of the subset of the users; and
    by one or more computing devices, adding the news-feed entries to a news feed associated with the shared space.

2. The method of claim 1, further comprising:
    by one or more computing devices, accessing location data of a particular user of the social networking system; and
    by one or more computing devices, if the particular user is at or near a location associated with the shared space:
        then sending the news feed to a client device of the particular user, causing an application hosted by the client device to present the news feed to the particular user.

3. The method of claim 1, further comprising:
    by one or more computing devices, creating a structured document comprising the news feed associated with the shared space.

4. The method of claim 1, further comprising:
by one or more computing devices, creating an aggregated news feed entry for the news feed associated with the shared space.

5. A system comprising:
one or more processors; and
a memory coupled to the processors comprising instructions executable by the processors, the processors being operable when executing the instructions to:
- receive, from each of a plurality of users, a current location and a posting request to a social networking system;
- assess social and spatio-temporal proximity between or among a subset of the users based at least in part on the current location of each of their posting requests;
- create a shared space for the posting requests of the subset of the users that are within a threshold spatio-temporal proximity;
- compose one or more news-feed entries from one or more of the posting requests of the subset of the users; and
- add the news-feed entries to a news feed associated with the shared space.

6. The system of claim 5, wherein the processors are further operable when executing the instructions to:
- access location data of a particular user of the social networking system; and
- if the particular user is at or near a location associated with the shared space, then send the news feed to a client device of the particular user, causing an application hosted by the client device to present the news feed to the particular user.

7. The system of claim 5, wherein the processors are further operable when executing the instructions to create a structured document comprising the news feed associated with the shared space.

8. The system of claim 5, wherein the processors are further operable when executing the instructions to create an aggregated news feed entry for the news feed associated with the shared space.

9. One or more computer-readable non-transitory storage media embodying software that is operable when executed to:
- receive, from each of a plurality of users, a current location and a posting request to a social networking system;
- assess social and spatio-temporal proximity between or among a subset of the users based at least in part on the current location of each of their posting requests;
- create a shared space for the posting requests of the subset of the users that are within a threshold spatio-temporal proximity;
- compose one or more news-feed entries from one or more of the posting requests of the subset of the users; and
- add the news-feed entries to a news feed associated with the shared space.

10. The media of claim 9, wherein the software is further operable when executed to:
- access location data of a particular user of the social networking system; and
- if the particular user is at or near a location associated with the shared space, then send the news feed to a client device of the particular user, causing an application hosted by the client device to present the news feed to the particular user.

11. The media of claim 9, wherein the software is further operable when executed to create a structured document comprising the news feed associated with the shared space.

12. The media of claim 9, wherein the software is further operable when executed to create an aggregated news feed entry for the news feed associated with the shared space.

* * * * *